June 1, 1926.  
C. W. CAMPBELL  
1,587,282  
ELECTRIC TUBE PLATE VULCANIZER  
Filed June 13, 1925
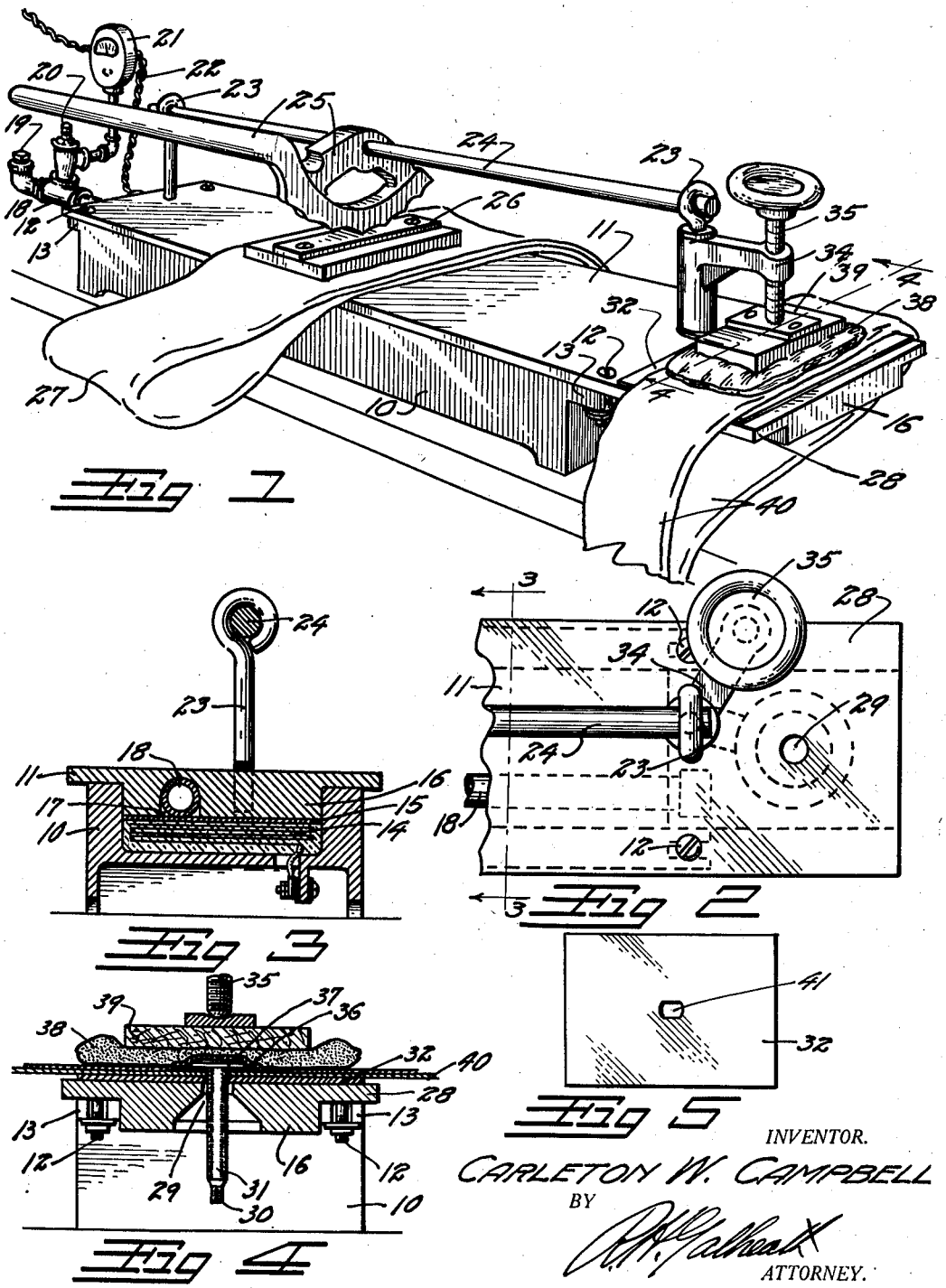
INVENTOR.  
CARLETON W. CAMPBELL  
BY  
ATTORNEY.

Patented June 1, 1926.

1,587,282

UNITED STATES PATENT OFFICE.

CARLETON W. CAMPBELL, OF DENVER, COLORADO, ASSIGNOR TO MOLL MANUFACTURING COMPANY, OF DENVER, COLORADO.

ELECTRIC TUBE-PLATE VULCANIZER.

Application filed June 13, 1925. Serial No. 36,930.

This invention relates to what is known as a tube plate vulcanizer, a device for curing repairs on the inner tubes of pneumatic vehicle tires, and has for its principal object the combining with a device of this character of an efficient apparatus for curing a repair around the valve stem of an inner tube while the stem is in place.

Another object is to so arrange the latter apparatus that the cure may be made while the valve stem is in its final position so that pressure may be exerted on the tube around and against the said stem thus making an air tight joint.

A further object is to provide an efficient method of embodying the temperature control apparatus in the plate in an economical and efficient manner.

A still further object is to provide means in a device of this character for uniformly and quickly distributing the heat from the heating elements to the tube plate.

Other objects and advantages reside in the detail construction of the invention which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:—

Fig. 1 is a perspective view of an electric tube plate vulcanizing device with my improvements embodied.

Fig. 2 is a plan view of the valve repair extremity of the device.

Fig. 3 is a detail cross section through the vulcanizer, taken on the line 3—3, Fig. 2.

Fig. 4 is a detail cross section of the valve stem repair extremity of the vulcanizer, taken on the line 4—4, Fig. 1.

Fig. 5 is a plan view of a valve plate through which the valve stem is passed when making a repair.

The device comprises a base 10 to which a tube plate 11 is secured by means of bolts 12. The bolts 12 pass through slotted lugs 13 formed in the base 10. The base 10 is recessed in its upper face and, in the bottom of this recess, one or more heating elements 14 are carried. Over the heating elements 14, a copper plate 15 is laid. The plate 11 carries a downward-projecting thickened portion 16 adapted to fit within the recess in the base 10 and, when the bolts 12 are tightened, serves to clamp the heating elements 14, the copper plate 15, and the tube plate 11 tightly together.

The copper plate 15 is one of the features of the invention. It forms a smooth contact surface for the heating elements and protects them from injury which might result from their being clamped against the rough cast surface of the plate. Copper, as is well known, is one of the best of heat conductors. It, being relatively soft, will be forced into all of the irregularities of the under surface of the plate 11, into close contact therewith, and will serve as a conductor and distributor of the heat from the heating elements 14 to all parts of the plate 11.

A longitudinal groove 17 is formed in the under surface of the plate 11, in which a water pipe 18 is retained against the copper plate 15. One extremity of the water pipe 18 projects beyond the plate 11 terminating in a filling plug 19. A safety valve 20 and a pressure operated electrical control gauge 21 are in communication with the pipe 18.

The gauge 21 is in electrical series with feed wires 22 which supply the heating elements with current. When the steam pressure in the pipe 18 has reached a point corresponding to the temperature desired, the current is shut off from the elements by the gauge 21.

Two standards 23 are threaded into the plate 11 and are provided with eyes at their upper extremities in which a longitudinal clamp bar 24 is carried. One of the standards 23 carries a hinged bracket 34, in which, a clamp screw 35 is threaded. One or more clamping levers 25 are carried on the bar 24 and serve, through the medium of a clamp block 26, to clamp a tube, such as illustrated at 27, against the tube plate 11 for ordinary repairs.

The clamping levers 25 form no part of the present invention, they being fully described in applicant's Patent No. 1,539,828, issued June 2, 1925.

For repairs around the valve stem, illustrated at 30, of an inner tube, illustrated at 40, the plate 11 is extended beyond the base 10 as shown at 28, and is provided with an opening 29 for the reception of the valve stem 30. The valve stems at present in use are found in two different sizes and are provided with flat sides 31. The opening 29 is made round and of a diameter to easily accommodate the larger size of valve stem. To prevent the gum from being forced into the opening 29 around the stem 30, I provide suitable valve plates 32, see Fig. 5, each having an opening 41 of a shape and size to exactly conform to a certain valve stem.

In making valve repairs, the new gum, indicated at 36, is placed around the valve stem 30 on the inside of the tube against the valve flange (indicated at 37). The proper valve plate 32 is placed over the valve stem and the stem is inserted through the opening 29. A flexible metallic pad 38 is placed over the tube and a clamping block 39 is placed over the pad. The clamping screw 35 is then brought over the block and tightened. This causes the pad to conform to the shape of, and exert a uniform pressure on, the repair and the heat from the plate will cure the gum.

The flexible metallic pad 38 comprises a bag of granular metallic material, such as copper filings, and will readily conform to the shape of the repair and, when compacted, will exert pressure and conduct heat as would a solid metal block. The pad 38, however, forms no part of the present invention it being more fully described in applicant's copending application, Serial No. 36,931, filed June 13, 1925.

While a specific form of the improvement has been described and illustrated herein, it is desired to be understood that the same may be varied, within the scope of the appended claims without departing from the spirit of the invention.

Having thus described the invention, what I claim and desire secured by Letters Patent is:—

1. A vulcanizing device comprising a base; heating elements carried in said base; a vulcanizing plate carried on said base; said plate extending beyond said base and being provided with an opening in said extended portion; and means for clamping an article over said extended portion.

2. A vulcanizing device comprising a base; a heating element carried in said base; a vulcanizing plate carried on said base, said plate extending beyond said base and being provided with an opening in said extended portion; a detachable plate having an opening adapted to receive the valve stem of pneumatic tire arranged for placing over said first opening and means for clamping an article over said detachable plate.

3. The combination with a vulcanizing device having an opening for the reception of the valve stem of pneumatic tire of a detachable plate adapted to be placed over said opening and having a second opening exactly conforming to the shape of said valve stem.

4. A vulcanizing device comprising a base member having a recess formed in the top thereof; a heating element carried in said recess; a heat conducting plate carried on said heating element; a vulcanizing surface adapted to cover said recess and project downward therein and means for clamping said surface to said base so that said downwardly projecting portion will clamp said base, said heating element, said heat conducting plate and said vulcanizing surface together.

5. A vulcanizing device comprising a base member having a recess formed in the top thereof; a heating element carried in said recess; a plate adapted to cover said recess and project downward therein and means for clamping said plate to said base so that said downwardly projecting portion will exert pressure on said heating element and a steam generating tube maintained in a downward opening groove in said plate.

6. A vulcanizing device comprising a vulcanizing plate; means for heating said plate; standards projecting above said plate a clamp bar joining said standards; a clamp carried by said clamp bar for clamping articles to said plate; a bracket hinged to one of said standards and a clamp screw carried by said bracket and adapted to clamp articles to said plate.

In testimony whereof, I affix my signature.

CARLETON W. CAMPBELL.